Nov. 29, 1960    J. D. COLEMAN    2,961,977
REFUSE AND GARBAGE DISPOSAL APPARATUS
Filed June 13, 1956    4 Sheets-Sheet 1
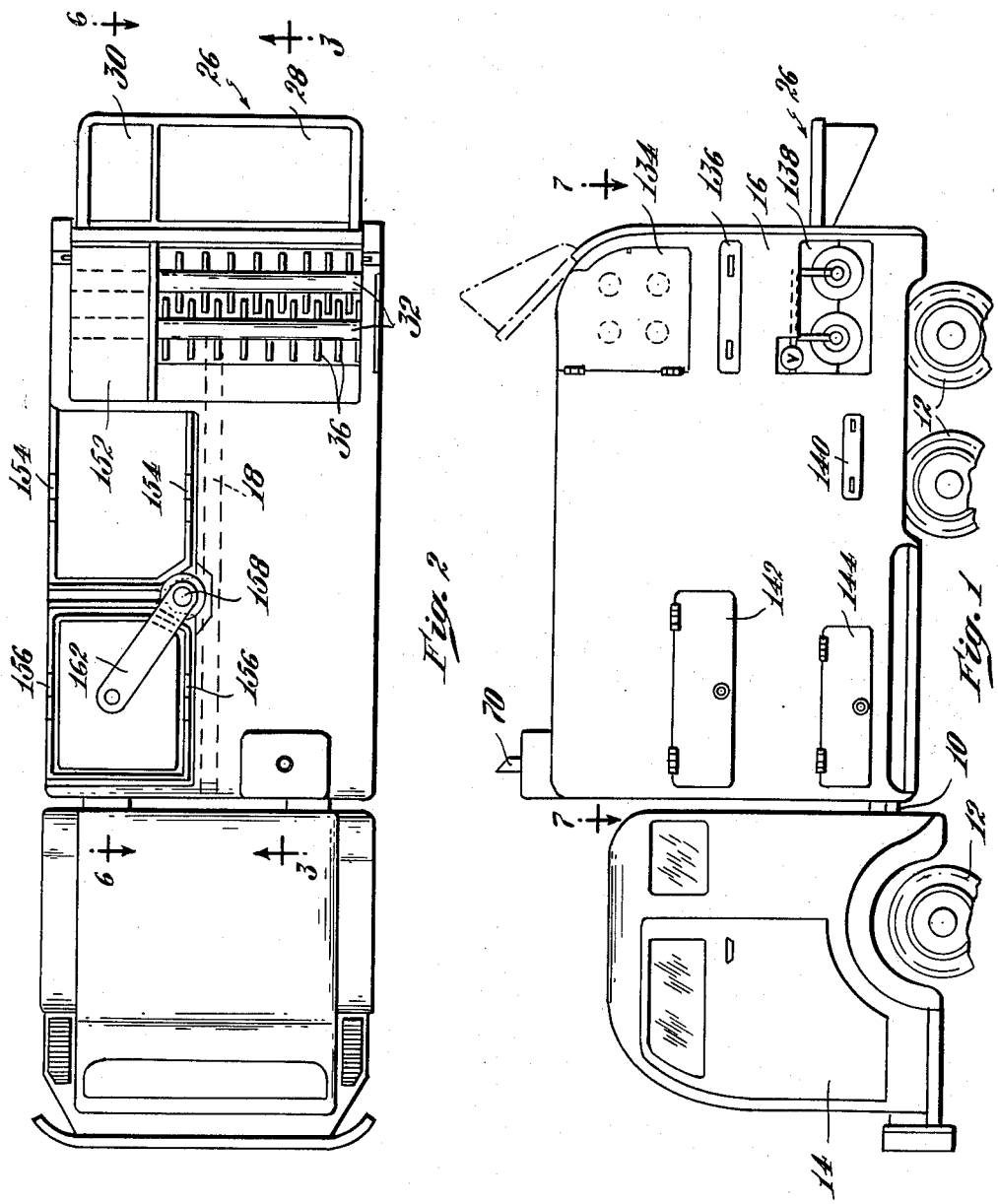
Inventor
John D. Coleman
by Roberts, Cushman & Grover
Attys Nov. 29, 1960    J. D. COLEMAN    2,961,977
REFUSE AND GARBAGE DISPOSAL APPARATUS
Filed June 13, 1956    4 Sheets-Sheet 2
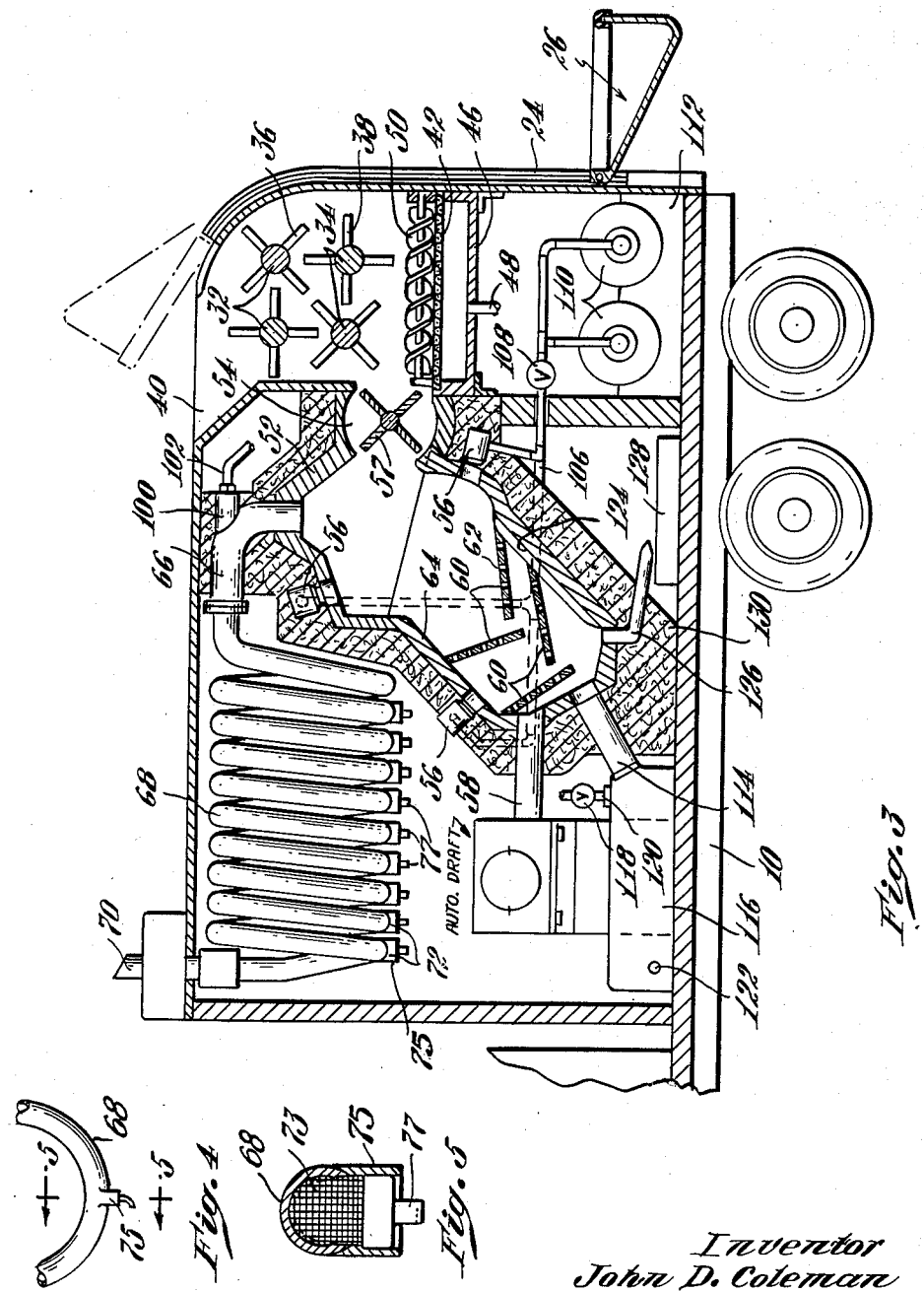
Inventor
John D. Coleman
by Roberts, Cushman & Grover
Attys Nov. 29, 1960 J. D. COLEMAN 2,961,977
REFUSE AND GARBAGE DISPOSAL APPARATUS
Filed June 13, 1956 4 Sheets-Sheet 3

Inventor
John D. Coleman
by Roberts, Cushman & Grover
Att'ys

Nov. 29, 1960 J. D. COLEMAN 2,961,977
REFUSE AND GARBAGE DISPOSAL APPARATUS
Filed June 13, 1956 4 Sheets-Sheet 4
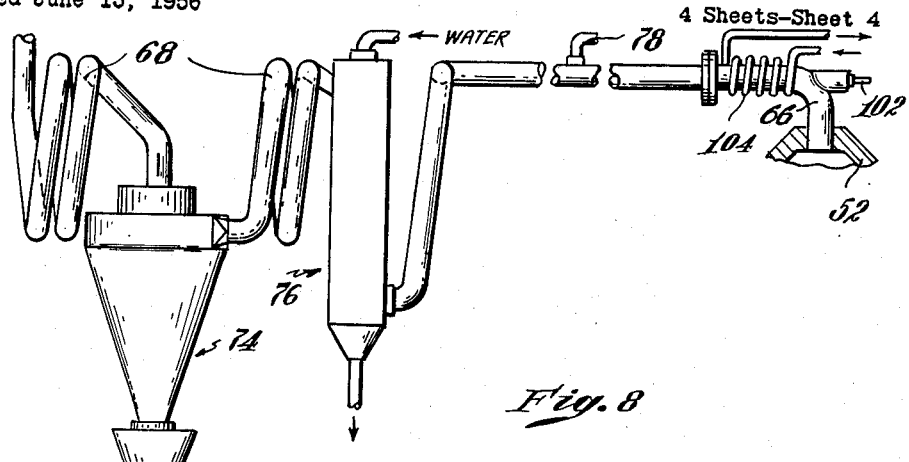
*Fig. 8*
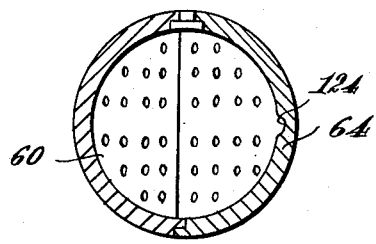
*Fig. 9*
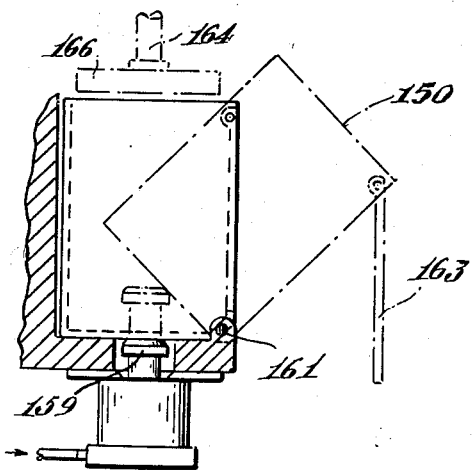
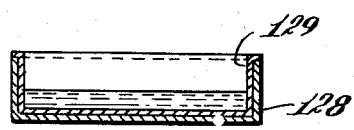
*Fig. 11*
*Fig. 10*
Inventor
John D. Coleman
By Roberts, Cushman & Grover
Attys

2,961,977

Patented Nov. 29, 1960

2,961,977

REFUSE AND GARBAGE DISPOSAL APPARATUS

John D. Coleman, 95 Russett Road, West Roxbury, Mass.

Filed June 13, 1956, Ser. No. 591,198

3 Claims. (Cl. 110—8)

This invention relates to refuse disposal apparatus and has for its principal objects to provide a mobile apparatus such as a truck for traversing the area to be served; which will en route reduce the collected combustible material and garbage to ash without creating an unhealthy or disagreeable smudge or odor; and which will reduce incombustible material to compact bales which may be transferred at intervals to auxiliary trucks en route, thereby to eliminate long hauls to dumping areas and hence to economize in the cost of refuse disposal which has become burdensome because of the cost of long hauls. In accordance with the foregoing the apparatus herein disclosed is provided with means for shredding the combustible material and breaking up light metal articles and glass prior to incineration and means for feeding the shredded material over a grating which provides drainage for any liquids contained in the refuse into the upper end of an inclined retort in which it gravitates freely toward the bottom. Naked flames in the form of jets are projected through the walls of the retort at a number of points into the descending material together with air for supporting combustion and baffles are interposed at intervals along the walls to retard the flow and hence to increase the length of time of exposure of the material to the flame. Preferably the baffles are constructed and arranged to be easily removable from the retort to permit replacement when they become clogged. The retort has a gate at its top to prevent flareback, that is, entrance of the flame into the shredder and also at its top an exhaust conduit or stack through which the gaseous products of combustion are discharged. The conduit is preferably convolute so as to provide a long path between the retort and the point of discharge to the atmosphere, compressed into a small state and within the convolutions are separators in the form of filters, centrifuges and/or washers for removing all of the solid matter so that the gases issuing from the conduit will be completely free of solid matter. The separators are arranged to be easily removable for cleaning and/or replacement. A deodorant may also be introduced into the stream of gases along the conduit to neutralize any objectionable odors and preferably the conduit is refrigerated in part to bring the gases down to a temperature such that when it escapes from the conduit it will not singe foliage. The solid and liquid residue at the base of the retort are discharged into suitable containers. To assist in collecting and discharge of the liquid residue the retort is channeled on its lower side and the discharge port is located at the lower corner of the retort at the lower end of the channel. The container for receiving the liquid residue has in it a suitable sheet metal shell which when filled with liquid becomes a solid mass and may be removed from the container.

The incinerator apparatus is located in one longitudinal half of the truck and in the other half is located apparatus comprising a chamber for receiving incombustible metal such as metal scrap and a press arranged to be lowered into the chamber to crush the metal deposited therein. The chamber itself may be removable from the truck so that when filled a servicing truck may be called to lift the chamber from the truck and replace it with an empty one or the chamber may have a removable lining receptacle which when filled with crushed metal may be elevated from the chamber for removal by suitable tackle carried by the servicing truck or slid out through a side door provided in the wall of the chamber. There may be one or two crushing chambers as desired, and depending somewhat upon the size of the apparatus.

The invention will now be described in greater detail with reference to the accompanying drawings wherein:

Fig. 1 is a side elevation of a truck embodying the incinerating and crushing apparatus of my invention;

Fig. 2 is a plan view looking down on the top of the truck as shown in Fig. 1;

Fig. 3 is a vertical section taken on the line 3—3 of Fig. 2 and to somewhat larger scale, showing the incinerating apparatus;

Fig. 4 is a fragmentary part of one convolution of the discharge stack;

Fig. 5 is an enlarged section taken on the line 5—5 of Fig. 4;

Fig. 8 is an elevation of the discharge stack with separators and with cooling means;

Fig. 9 is a diametrical section of the retort showing the two-part lining for ease of removal;

Fig. 10 is a vertical section of a dump receptacle for the bailer; and

Fig. 11 is a vertical section through the container having the disposal lining.

Figure 7:
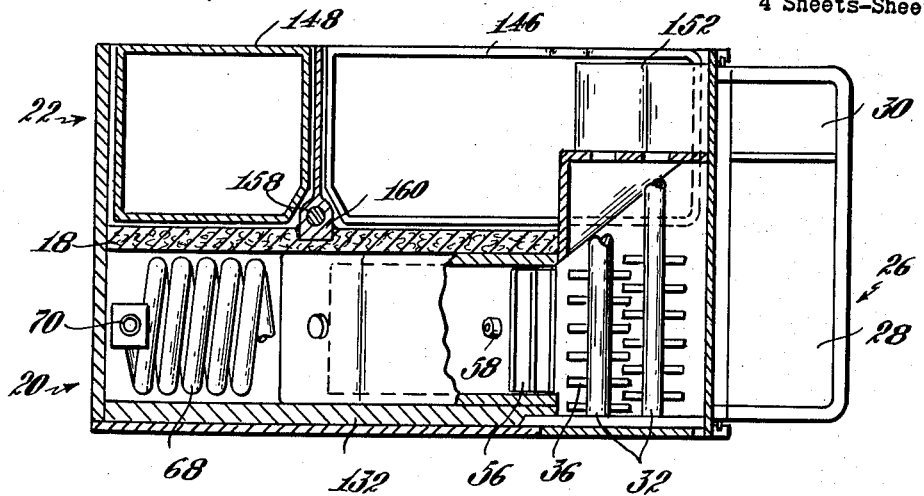
Fig. 7 is a horizontal section taken on the line 7—7 of Fig. 1, showing the incinerator and crushing sections in their respective positions.

Referring to the drawings, the apparatus is mounted on a truck having a conventional chassis 10 with supporting wheels 12, a cab 14 and a body 16. The body 16 is of conventional rectangular section, having high walls to provide for large capacity, construction of suitable heavy gauge metal to withstand rough usage and is divided longitudinally, substantially along its front to back center line by a vertical wall 18 separating the body into two side by side longitudinally extending chambers 20 and 22, as shown in Fig. 7. At the rear end of the body there is attached to the end wall spaced, vertically extending tracks 24 which support a skip bucket 26, which is elevated by suitable means from a position convenient for placing refuse in it near the bottom of the body to the top of the body, the track and elevating means being designed to tilt the skip to an inclined position, such as shown in dotted lines, to discharge material placed in it into the respective chambers 20 and 22. The skip as shown in Fig. 5 is divided into two compartments 28 and 30, the former for receiving combustible refuse and the latter for receiving incombustible refuse. The skip and its elevating mechanism are of conventional construction and hence the details are omitted.

The chamber 20 contains incinerator apparatus and at the top of the body there is provided shredding means for shredding combustible material to be burned and for tearing up and breaking up light metal articles such as cans and glass bottles, preliminary to incineration. The shredder comprises pairs of shafts 32 and 34 extending transversely of the body which carry hardened teeth 36 and 38 which intermesh and reduce the material deposited within their sphere of operation to a comminuted state suitable for burning. The top of the body is provided with an opening 40 through which the refuse deposited by the skip bucket falls onto the upper shredding members. Beneath the shredders there is a horizontal perforate wall 42 through which liquid expressed from the refuse during the shredding operation may drain into a receptacle 46 subjacent to the wall. Preferably the bottom of the receptacle is inclined toward one side and has at its lower end a drain pipe 48 through which the liquid may be drained at intervals. One or more feed screws 50 are mounted between the lower side of the shredders on the perforate wall 42 for collecting and feeding the comminuted refuse forwardly into the upper end of an inclined retort 52 within which combustion of the refuse takes place. The retort has a charging opening 54 adjacent the inner end of the screw 50 through which the refuse is forced and within the opening there is mounted a stile 57 having radially vanes which permit refuse to be introduced without allowing flameback, that is flame from the retort from entering the shredder.

At several places in the wall of the retort there are provided jet burners 56 for projecting naked flame into the retort against the shredded refuse as it gravitates downwardly toward the bottom thereof, and preferably some air is supplied through a conduit 58 near the bottom of the retort to assist in supporting combustion. In order to retard the gravitational flow of the material a series of inclined grate baffles 60 having apertures 62 therethrough are mounted on the inside of the retort in overlapping relation. By slowing up flow of the refuse complete combustion is assured. Preferably the baffles are removably mounted so that they may be easily taken out for cleaning or replacement and to this end they may be attached to a split removable lining 64 (Fig. 9) which by collapsing may easily be withdrawn from the retort.

At the top of the retort there is an exhaust pipe 66 and a convolute stack 68 extending forwardly through the chamber at the upper part thereof and terminating in an exhaust pipe 70 at the top of the truck through which the hot gases of combustion are exhausted to the atmosphere. The convolute stack 68 is designed to provide within a compressed space a long path of travel for the gases of combustion to permit the gases to be operated on in a manner to separate solid matter therein and to cool them to a temperature which is not damaging at its exhaust point. To this end within the convolution there are interposed filters 72 (Figs. 4 and 5) of increasing fineness in the direction of travel of the hot gases, which filters may be removed for cleaning, one or more centrifuges 74 (Fig. 8) designed to assist in separating solid matter from the stream of gases, these also being removable for cleaning, and one or more washing units 76 for dissolving out and entraining solid matter so that when the gases issue from the stack 70 they will have been scrubbed clean of solid matter so that no smoke will be visible. Deodorizing means in the form of an ejector 78 may also be interposed at a given point in the convolution to neutralize any odor that may be present. As shown in Figs. 4 and 5 the filters are in the form of fine mesh screens 73, fitted through sleeves 75, each having a handle 77 by which it may be inserted or withdrawn. The centrifuge and washer are of conventional construction and need not be described herein.

Because of the high heat of combustion involved it is desirable to provide a refrigerating coil 104 which may be located around the conduit 66 to lower the temperature so that when the gases issue from the stack there will be no danger of injury to personnel or of foliage along the route of travel. This cooling may be assisted in part also by the addition of a stream of air through an injector tube 102 which further dilutes the stream of combustible gases and also assists in promoting forward movement of it and of maintaining a suitable draft within the retort which would be destroyed by the cooling and the various separators disposed along the convolutes.

Complete combustion of the refuse results in fly ash and the reduction of light metals such as tin cans are made of and bottle glass to liquid form due to the high heat attained. A temperature in the order of 2750° F. in the retort is provided by supplying the burners with a combustible gas of high heat value such as propane. To this end they are connected by conduits 106 (Fig. 3) and a valve 108 to a pair of gas cylinders 110 supported at the rear of the truck in a cradle 112 and removably replaceable. In ordinary use a single cylinder of gas will keep the apparatus burning at full capacity for an entire day. Optionally atomized fuel oil or other combustible hot burning fuel may be employed.

An inclined conduit 114 is provided at the bottom of the retort through which the ash will flow into a receptacle 116, the latter being arranged to be easily removed when necessary. Since the ash is fine it may be removed by flushing the receptacle 116. To this end the latter is provided with a nipple 120 and valve 118 through which water may be introduced to the top of the receptacle and a valve 122 at the bottom thereof, through which the water and ash may be drained.

To facilitate collection and discharge of the liquid, such as molten metal and glass, the lower wall of the retort is provided with a longitudinally extending channel or trough 124. At the lower end of this channel there is a conduit 126 which projects through the wall above a receptacle 128. Preferably this receptacle 128 is removable and has within it a removable sheet metal lining 129 adapted to receive the liquid metal and glass to prevent it from solidifying within the receptacle. The sheet metal container can be made of cheap enough material so that it can be thrown away with the solidified materials deposited in it.

The walls of the retort are insulated with suitable heat resistant material 130 which is preferably continued forwardly of the retort to the front end of the chamber as shown in Fig. 3.

The side wall of the body, shown in Fig. 1, is provided with hinged doors 134, 136, 138, 140, 142 and 144 to permit access to and removal of the various parts of the incinerator for repair or cleaning.

The chamber 22 is provided for receiving non-combustible material and with means for crushing it so that a considerable quantity may be accumulated in the truck before it is necessary to dispose of it so that it may be placed in suitable form for removal by a servicing truck or auxiliary truck at infrequent intervals. As illustrated, this half of the truck may be divided into two compartments 146 and 148, although it is to be understood that it is not restricted to such division as for example in a smaller truck for use in a less densely populated area one compartment may suffice. As herein shown (Fig. 6), in each compartment there is a metal container 149 and 150. The rear end of the container 149, at its top, is beveled off so as to fit under the shredder bars which extend across the top of the body, and having bearing support in the walls. An apron 152 (Figs. 2, 6 and 7) extends over the shredders and guides material deposited at the top of the body at this side of the truck into the container 149. The other container is for receiving metal lifted by hand and thrown into it. To permit ease of removing the containers 149 and 150, they may be provided with handles 154, 156 to receive tackle equipment carried by a service truck. The forward receptacle, of course, may be easily removed through the top of the body, however, the rear container 149 because of its projection under the shredders can be more easily removed through a side opening in the body. Accordingly, the sides of the truck body may be provided with openings to permit either or both of the receptacles to be removed therethrough. If desired an elevator in the form of a ram 159 (Fig. 10) may be mounted in the bottom of each chamber operable to lift the receptacles 149 and 150 upwardly and to tip them out through the side openings, or to positions through the top of the body where they may easily be connected to tackle for hoisting them free. If discharge is to be by tipping each receptacle is connected at its outer side by hinge pins 161 to the body so that it can tilt outwardly. The outer wall 163 of each receptacle is in turn hinged at its top so that it can swing out. Suitable latch means is provided at the lower ends of the walls to hold them in place during contacting of the material within the receptacle.

Figure 6:
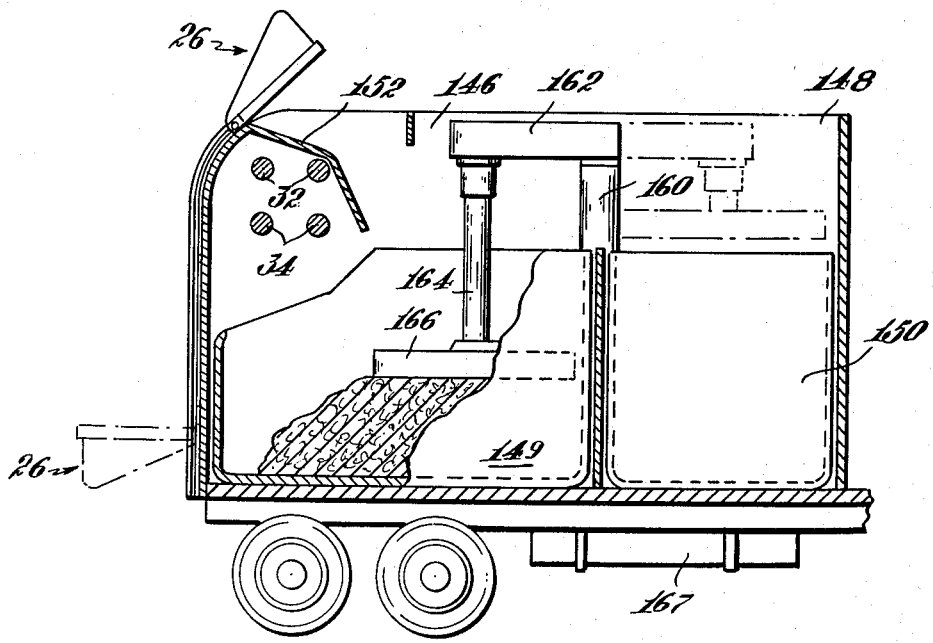
Fig. 6 is a vertical section taken on the line 6—6 of Fig. 2, showing the crushing apparatus.

The material delivered to the receptacles is crushed and reduced to compact bales by a press mounted for operation in either one or the other of the chambers. As shown in Figs. 2, 6 and 7 this is provided by a shaft 158 mounted in the dividing wall 18 for rotation and vertical reciprocation in a bearing 160 which has at its upper end a horizontal arm 162 to the distal end of which is connected a shaft 164, to the lower end of which is fixed a press plate 166 corresponding substantially in cross section to the receptacles. By swinging the arm 162 on the shaft 158, the presser plate 166 may be moved to a position to coincide with either of the receptacles and by a power cylinder, not shown, then may be lowered to cause the presser plate 166 to crush the material against the bottom and thus to reduce it to as compact form as possible.

It is to be understood that the apparatus described may be varied to size to accommodate the area which it is to service, for example, if an extremely densely populated area is to be serviced the truck may be provided with two combustion chambers located tandemly or side by side, thereby to double the capacity of the truck, or if the area is sparsely populated a single combustion unit and a single crushing unit may be employed. Moreover, the cleaning and cooling of the gases of combustion do not necessarily require the use of all of the elements recited in combination that is, mechanical filter, centrifugal separators and washers or under certain circumstances the filters may be enough without the other means or the centrifugal separators may suffice alone or the washers may suffice alone, or various combinations may be employed and with sufficient introduction of fresh air at the exhaust it may be possible to dispense with the refrigerant cooling means.

It should be understood that the present disclosure is for the purpose of illustration only and that this invention includes all modifications and equivalents which fall within the scope of the appended claims.

I claim:

1. In a refuse disposal truck, a dual compartment body providing chambers extending lengthwise of the body at opposite sides of a longitudinal center line, one of said chambers having incinerator means for burning flammable material and the other of said chambers having means for pressing and compacting non-flammable material, and a receptacle pivotally supported in said other chamber for tilting movement outwardly through a side opening, said receptacle having a side wall pivoted at its upper end for swinging movement when a receptacle is tilted outwardly to permit discharge of its contents.

2. In a refuse disposal truck, a dual compartment body providing chambers extending lengthwise of the body at opposite sides of a longitudinal center line, one of said chambers having an incinerator means for burning flammable material and the other of said chambers having means for crushing and compacting non-flammable material, a receptacle pivotally supported in said other chamber for tilting movement through a lateral opening and a power operated ram for tilting said receptacle to discharge its contents.

3. In a refuse disposal truck, a dual compartment body providing chambers extending lengthwise of the body at opposite sides of a longitudinal center line, one of said chambers having incinerator means for burning flammable material and the other of said chambers having means for crushing and compacting non-flammable material, means dividing said other chamber into two compartments and a power operated presser plate mounted above the compartments for swinging movement to be operative in either one or the other of said compartments.

References Cited in the file of this patent

UNITED STATES PATENTS

| 391,614 | Hoskin et al. | Oct. 23, 1888 |
| 551,850 | Chesebrough | Dec. 24, 1895 |
| 1,344,668 | Young | June 29, 1920 |
| 1,518,200 | Herlichy | Dec. 9, 1924 |
| 1,864,633 | Bessent | June 28, 1932 |
| 1,977,644 | Paxton | Oct. 23, 1934 |
| 2,014,796 | Blumenthal et al. | Sept. 17, 1935 |
| 2,045,115 | Allen et al. | June 23, 1936 |
| 2,151,079 | Bowen | Mar. 21, 1939 |
| 2,601,657 | Brandt et al. | June 24, 1952 |
| 2,643,014 | Calcagno | June 23, 1953 |
| 2,772,438 | Diaz | Dec. 4, 1956 |

FOREIGN PATENTS

| 748,981 | Great Britain | May 16, 1956 |